United States Patent
Krambeck

(10) Patent No.: US 6,893,092 B1
(45) Date of Patent: May 17, 2005

(54) INERTIA INCREASING VEHICLE SEAT ADJUSTMENT MECHANISM

(75) Inventor: Dagoberto Krambeck, Troy, MI (US)

(73) Assignee: Fisher Dynamics Corporation, St. Clair Shores, MI (US)

( * ) Notice: Subject to any disclaimer, the term of this patent is extended or adjusted under 35 U.S.C. 154(b) by 0 days.

(21) Appl. No.: 10/718,043

(22) Filed: Nov. 20, 2003

(51) Int. Cl.[7] .................................................. B60N 2/02
(52) U.S. Cl. .................................................. 297/362.11
(58) Field of Search .......................... 297/361.1, 362, 297/362.12

(56) References Cited

U.S. PATENT DOCUMENTS

| | | | | |
|---|---|---|---|---|
| 4,521,055 A | * | 6/1985 | Fudala | 297/362 |
| 5,295,730 A | * | 3/1994 | Rees | 297/361.1 |
| 5,868,470 A | * | 2/1999 | Hyder et al. | 297/362.14 |
| 6,055,877 A | * | 5/2000 | Welterlin et al. | 248/429 |
| 6,131,999 A | * | 10/2000 | Piekny et al. | 297/378.12 |

* cited by examiner

Primary Examiner—Milton Nelson, Jr.
(74) Attorney, Agent, or Firm—Harness, Dickey & Pierce, P.L.C.

(57) ABSTRACT

An inertia increasing seat-recliner assembly for adjusting the angular position of a vehicle seat back relative to a seat bottom is provided. The seat-recliner includes a drive assembly, a driven assembly adapted to be coupled to a seat back, a transmission assembly operably connecting the drive assembly to the driven assembly, and a coupler disposed between the drive assembly and the transmission assembly. The coupler includes a first member and a second member adapted to selectively disengage, thereby increasing inertia in the drive assembly prior to driving the transmission. The first member includes a radial arm appending therefrom and the second member includes a longitudinal arm appending therefrom. The radial and longitudinal arms move relative each other, wherein relative motion causes the arms to engage, thereby driving the transmission.

26 Claims, 5 Drawing Sheets

INERTIA INCREASING VEHICLE SEAT ADJUSTMENT MECHANISM

FIELD OF THE INVENTION

The present invention relates to seat-recliner assemblies and, more particularly, to powered seat-recliner assemblies.

BACKGROUND OF THE INVENTION

Occupant comfort is a design objective for automobile manufacturers. In particular, vehicle seating systems are a significant focus for improved comfort. Conventional seating systems include reclining assemblies that enable an occupant to adjust the angle of the seat back. Modern reclining systems are often powered, thus making the system easier to use, but more complex to manufacture and implement. Powered reclining systems often include an electric motor, a transmission assembly, an actuator cable connecting the motor to the transmission assembly, and an arm connecting the transmission assembly to the seat back.

A typical transmission assembly includes a gear train for transferring the torque from the actuator cable to the arm. Occasionally, with this type of transmission assembly, the gears may become bound. One such way gears can bind is by activating the motor to drive the transmission and seat arm beyond their mechanical limits, thereby over-rotating the gears. Gears can also bind from the vibrational forces inherent in ordinary vehicle use. In some situations the motor can unbind the gears and drive the transmission in the usual manner. In others, however, the motor lacks the start-up torque required to unbind the gears and the motor fails. One solution to this problem is to upgrade the recliner motor; however, this solution is costly.

SUMMARY OF THE INVENTION

In view of the foregoing, an object of the present invention is to provide a cost-effective powered seat-recliner assembly capable of overcoming bound transmission gears.

Hence, a powered seat-recliner assembly is provided having a motor, a transmission assembly connected to the motor by an actuator cable, a driven assembly and a coupling disposed between the transmission assembly and the actuator cable. The coupling includes a first member driven by the actuator cable and selectively engaging a second member, which drives the transmission assembly. The coupling enables the motor to freely rotate and increase the rotational inertia in the drive assembly prior to driving the transmission assembly.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
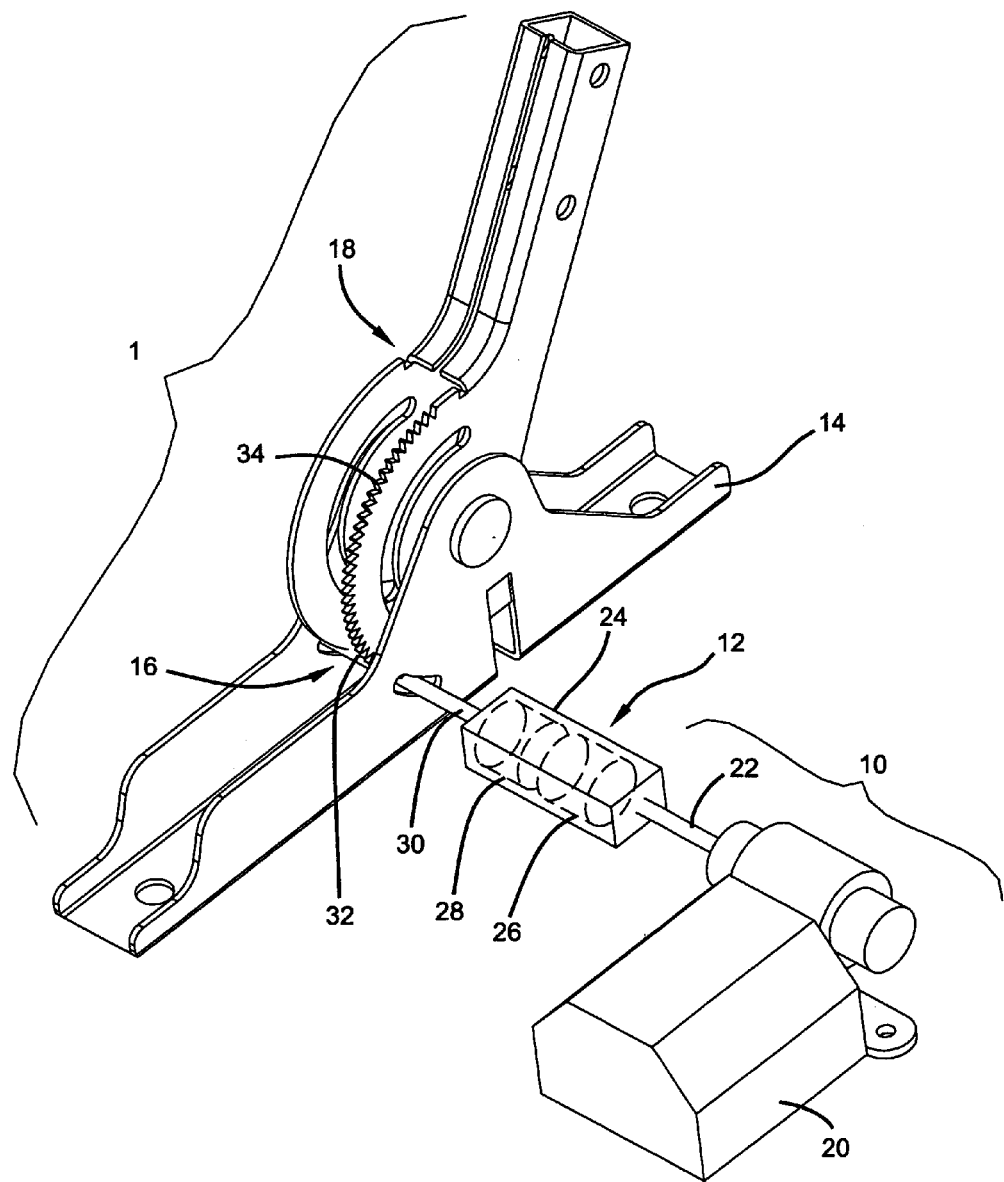
FIG. 1 is an isometric view of the seat-recliner assembly of the present invention.

The following description of the preferred embodiment(s) is merely exemplary in nature and is in no way intended to limit the invention, its application, or uses.

With reference to the drawings, a seat-recliner assembly 1 in accordance with the present invention generally including a drive assembly 10, an inertia-increasing coupling 12, a housing 14, a transmission assembly 16, and a driven assembly 18 is provided. Through the coupling 12, the drive assembly 10 drives the transmission assembly 16, which drives the driven assembly 18 to adjust the angular position of a seat back 210 relative to a seat bottom 212.

The drive assembly 10 includes a bi-directional electric motor 20 and an actuator cable 22. The coupling 12 includes a housing 24, a first member 26 connected to the actuator cable 22, and a second member 28 connected to the transmission assembly 16. The transmission assembly 16 includes a drive shaft 30 and a gear train 32 connecting the drive shaft 30 to the driven assembly 18. The driven assembly 18 includes a driven member 34 and an arm 36.

It should be appreciated that while FIG. 1 provides for a rotary seat-recliner assembly, linear seat-recliner assemblies are also intended to be within the scope of the present invention.

Figure 2:
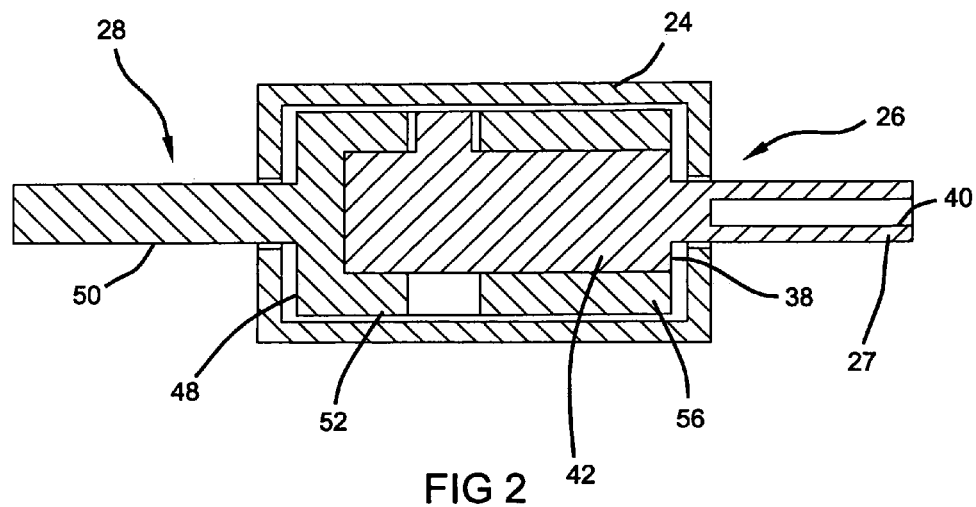
FIG. 2 is a cross sectional side view of a first embodiment of a coupling in accordance with the seat-recliner assembly of the present invention.
Figure 3:
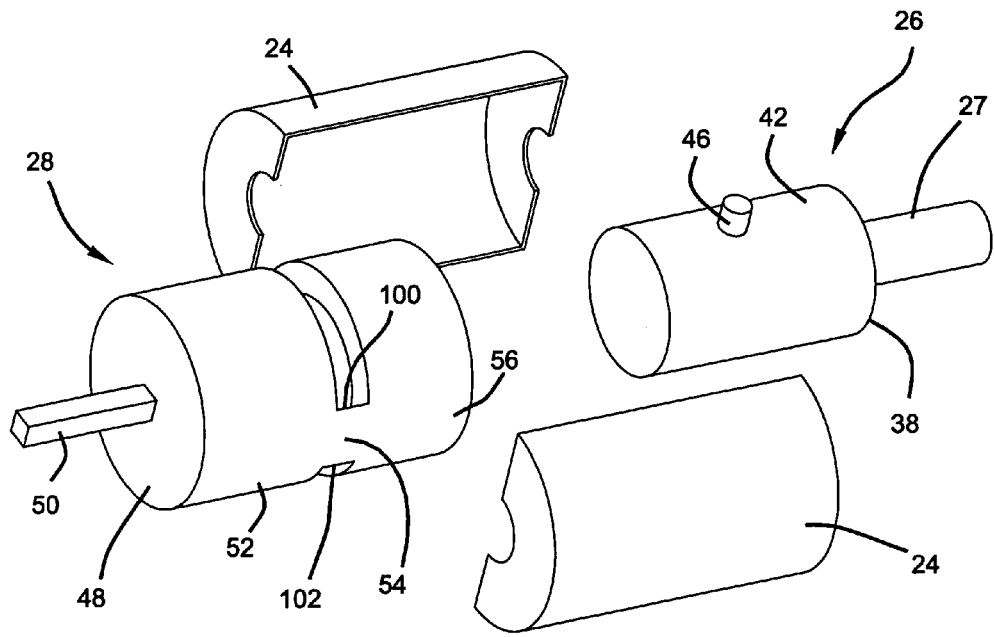
FIG. 3 is an exploded perspective view of the coupling of FIG. 2.

Now with specific reference to FIGS. 2 and 3, a first embodiment of the coupling 12 including a housing 24 and a first member 26 and a second member 28 having common rotational axes, wherein the first member 26 is adapted to selectively engage the second member 28. The first member 26 includes an input shaft 27 and an output body 38 disposed at an end of the input shaft 27. The input shaft 27 includes a cable cavity 40 of generally square cross section adapted to be operably connected to the actuator cable 22. The output body 38 includes a solid cylindrical base 42 having a radial arm 46 appending therefrom.

The second member 28 includes an input body 48 and an output shaft 50 having a generally square cross section and adapted to be operably connected to the drive shaft 30 (as shown in FIG. 1). The input body 48 includes a hollow cylindrical base 52, a longitudinal arm 54 (shown in FIG. 3) appending from an open end of the base 52, and a collar 56 having a same radial dimension as the base 52. While the longitudinal arm 54 is presented in FIG. 3 as having flat side walls 100, 102, alternative geometries are intended to be within the scope of the invention.

Figure 4:
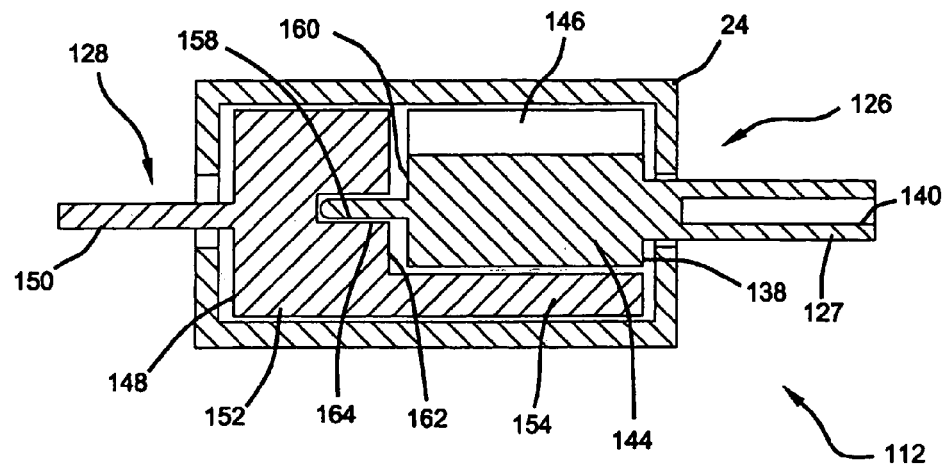
FIG. 4 is a cross sectional side view of a second embodiment of a coupling in accordance with the seat-recliner assembly of the present invention.
Figure 5:
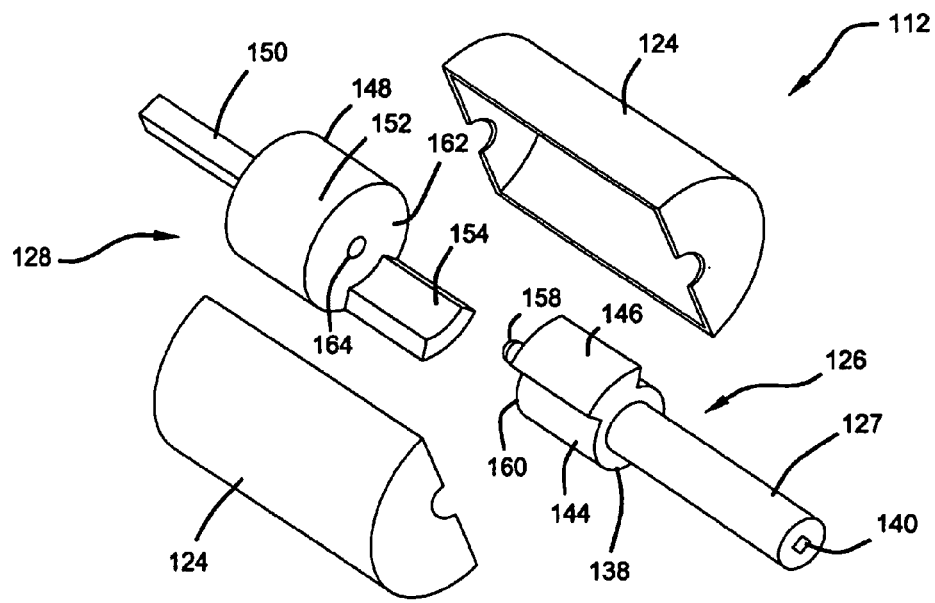
FIG. 5 is an exploded perspective view of the coupling of FIG. 4.

Now with specific reference to FIGS. 4 and 5, a second embodiment of the invention includes a coupling 112 having a housing 124, a first member 126, and a second member 128 having common rotational axes, wherein the first member 126 is adapted to selectively engage the second member 128. The first member 126 includes an input shaft 127 and an output body 138 disposed at an end of the input shaft 127. The input shaft 127 includes a cable cavity 140 of generally square cross section adapted to be operably connected to the actuator cable 22 (shown in FIG. 1). The output body 138 includes a solid cylindrical base 144 having a radial arm 146 appending therefrom. Furthermore, the output body 138 includes an alignment pin 158 appending from a working face 160 and extending along the rotational axis of the first member 126.

The second member 128 includes an output shaft 150 and an input body 148 disposed at an end of the output shaft 150 and adapted to be operably connected to the drive shaft 30 (shown in FIG. 1). The input body 148 includes a cylindrical base 152, a longitudinal arm 154 appending from the periphery of a working face 162 of the cylindrical base 152, and an alignment cavity 164 within the working face 162 extending along the rotational axis of the second member 128 and adapted to receive the alignment pin 158.

Figure 6:
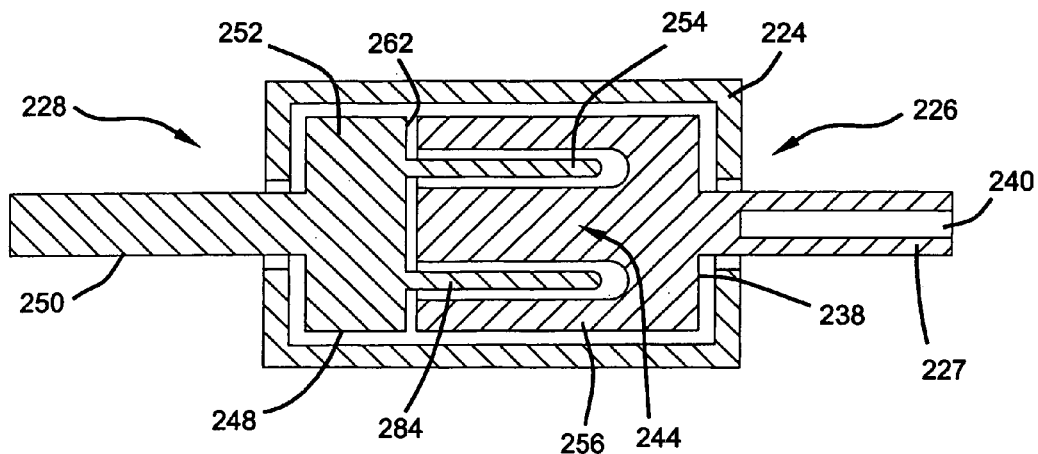
FIG. 6 is a cross sectional side view of a coupling in accordance with the seat-recliner assembly of the present invention.
Figure 7:
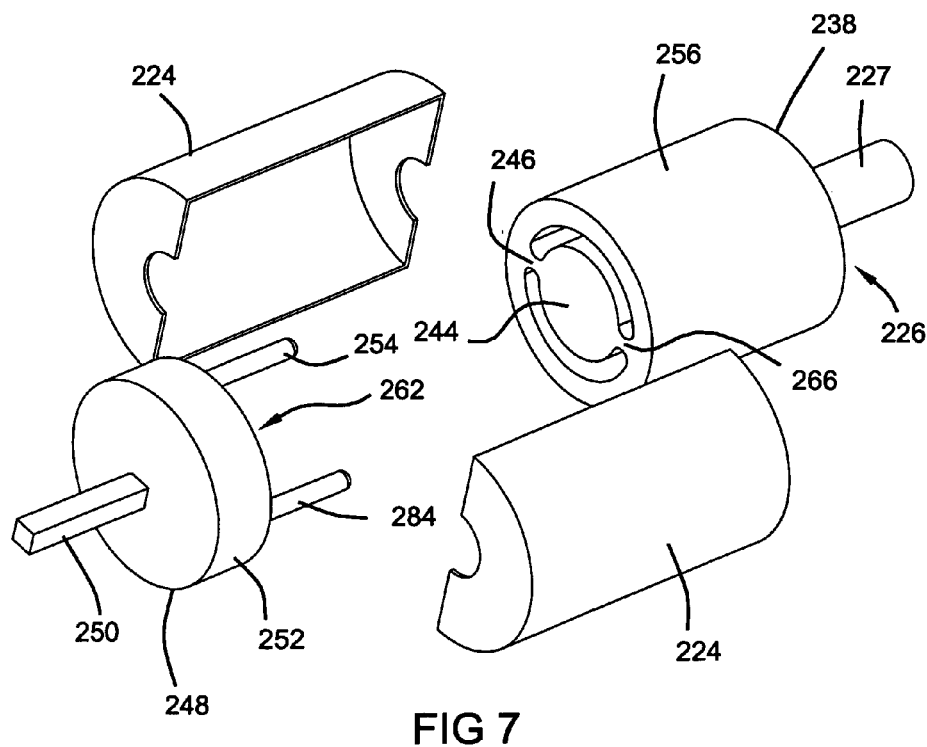
FIG. 7 is an exploded perspective view of the coupling of FIG. 6.

Now with specific reference to FIGS. 6 and 7, a third embodiment of the present invention includes a coupling 212 having a housing 224, a first member 226, and a second member 228 having common rotational axes, wherein the first member 226 is adapted to selectively engage the second member 228. The first member 226 includes an input shaft 227 and an output body 238 disposed at an end of the input shaft 227. The input shaft 227 includes a cable cavity 240 of generally square cross section adapted to be operably connected to the actuator cable 22. The output body 238 includes a solid cylindrical base 244, a pair of radial arms 246, 266 appending therefrom, and a collar 256. The collar 256 includes a larger diameter than the base 244 and is attached to an outer radial side wall of the radial arms 246, 266.

The second member 228 includes an input body 248 and an output shaft 250. The output shaft 250 has a generally square cross section and is adapted to be operably connected to the drive shaft 30 (shown in FIG. 1). The input body 248 includes a solid cylindrical base 252 having a pair of longitudinal arms 254, 284 appending from a working face 262 thereof and positioned on a common circular path having a smaller diameter than the base 252.

With reference to FIGS. 1, 2 and 3, during operation the motor 20 drives the actuator cable 22 and the actuator cable 22 rotates the input shaft 27 of the first member 26 of the coupling 12. The input shaft 27 thereby rotates the output body 38, moving the radial arm 46 from an initial side 100 of the longitudinal arm 54 to an engaging side 102 of the longitudinal arm 54. It should be appreciated that the opposite is true when the motor 20 is driven in the opposite direction. The rotational inertia of the output body 38 increases as the body 38 rotates from the initial side 100 to the engaging side 102. Therefore, the radial arm 46 contacts the engaging side 102 with greater rotational force, allowing it to overcome any forces presented by a bound transmission 16. The radial arm 46 engages the longitudinal arm 54, thereby rotating the second member 28 of the coupling 12. The coupling 12 thereby drives the transmission 16, which drives the driven assembly 18 and adjusts the angle of the seat back 210 (shown in FIG. 8) relative to the seat bottom 212 (shown in FIG. 8).

With reference to FIGS. 4, 5, 6 and 7, the second and third embodiments operate similarly to the first embodiment described above.

It should be appreciated that while the above embodiments are described as having the first member 26 driven by the cable 22 and the second member 28 driving the transmission 16, the opposite relationship, including a cable 22 driving the above described second member 28 and the above described first member 26 driving the transmission 16, is also intended to be within the scope of the invention.

Figure 8:
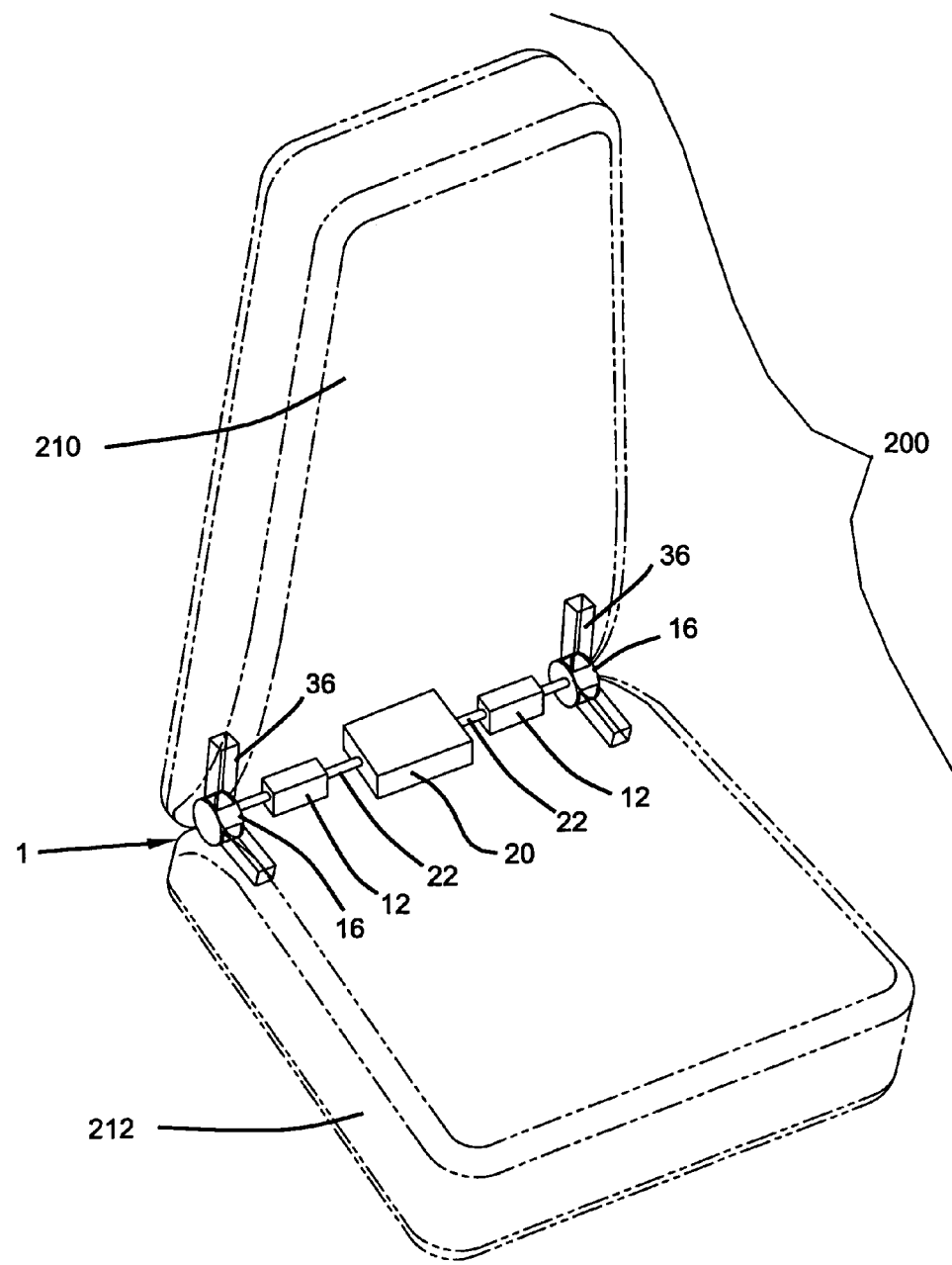
FIG. 8 is an isometric view of a vehicle seat assembly including an embodiment of the seat-recliner assembly of the present invention.

Now with specific reference to FIG. 8, a vehicle seat 200 is shown implementing the recliner assembly 1 of the present invention. The seat 200 generally includes a seat back 210 pivotally connected to a seat bottom 212. A recliner assembly 1 including a motor 20, a pair of actuator cables 22, a pair of couplings 12, and a pair of transmission assemblies 16 are attached beneath the seat bottom 212. The recliner assembly 1 further includes a pair of recliner arms 36 having one end pivotally attached to the respective transmission assembly 16 and another attached to and supporting the seat back 210. Thus, when the motor 20 is activated, the actuator cables 22 rotate the first members 26, as described above, of the couplings 12, which subsequently engage the second members 28, as described above, of the couplings 12 thereby driving the transmissions 16 and pivoting the seat-recliner arms 36 to adjust the angle of the seat back 210 relative to the seat bottom 212.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A seat-recliner assembly for adjusting the angular position of a seat back relative to a seat bottom, said recliner assembly comprising:
   a drive assembly;
   a driven assembly;
   a transmission assembly operably connecting said drive and driven assemblies; and
   an inertia increasing coupling linking said drive assembly and said transmission assembly and including a first member and a second member, said first and second members associated for a driving relationship and a non-driving relationship, said non-driving relationship increasing inertia in said drive assembly prior to driving said transmission assembly in said driving relationship.

2. The seat-recliner assembly of claim 1, wherein said transmission assembly includes a rotary seat-recliner mechanism.

3. The seat-recliner assembly of claim 1, wherein said coupling includes a housing for enclosing at least a portion of said first and second members.

4. The seat-recliner assembly of claim 1, wherein said transmission assembly includes a drive shaft and a gear train operably connecting said drive shaft to said driven assembly, and said drive assembly includes an actuator and an actuator cable.

5. The seat-recliner assembly of claim 4, wherein said inertia increasing coupling is disposed between said actuator cable and said drive shaft.

6. The seat-recliner assembly of claim 1, wherein said drive assembly includes an actuator and an actuator cable.

7. The seat-recliner assembly of claim 6, wherein said actuator includes a bi-directional electric motor.

8. The seat-recliner assembly of claim 1, wherein said first member has a radial arm appending therefrom, said second member has a longitudinal arm appending therefrom, and one of said first and second members is connected to said drive assembly and the other of said first and second members is connected to said transmission assembly.

9. The seat-recliner assembly of claim 8, wherein said radial and longitudinal arms are moveable relative each other along a common circular path, and relative motion of said longitudinal and radial arms causes said driving and non-driving relationships.

10. The seat-recliner assembly of claim 8, wherein said first and second members have a generally cylindrical geometry and said radial and longitudinal arms have a generally arched geometry.

11. The seat-recliner assembly of claim 8, wherein said second member includes a collar attached to a distal end of said longitudinal arm, said collar receiving said first member for maintaining alignment of said first and second members.

12. The seat-recliner assembly of claim 8, wherein said first member includes an alignment pin and said second member includes an alignment cavity for receiving said alignment pin.

13. The seat-recliner of claim 8, wherein said first member includes a plurality of radial arms and said second member includes a plurality of longitudinal arms.

14. A vehicle seat comprising:
a seat bottom;
a seat back coupled to said seat bottom and capable of pivotal adjustment relative to said seat bottom;
a seat-recliner assembly for adjusting the angle of said seat back relative to said seat bottom, said recliner assembly including:
a drive assembly;
a driven assembly;
a transmission assembly operably connecting said drive and driven assemblies; and
an inertia increasing coupling disposed between said drive assembly and said transmission assembly and including a first member and a second member, said first and second members associated for a driving relationship and a non-driving relationship, said non-driving relationship increasing inertia in said drive assembly prior to driving said transmission assembly.

15. The vehicle seat of claim 14, wherein said first member includes an alignment pin and said second member includes an alignment cavity for receiving said alignment pin.

16. The vehicle seat of claim 14, wherein said first member includes a plurality of radial arms and said second member includes a plurality of longitudinal arms.

17. The vehicle seat of claim 14, wherein said transmission assembly includes a rotary seat-recliner mechanism.

18. The vehicle seat of claim 14, wherein said coupling includes a housing enclosing at least a portion of said first and second members.

19. The vehicle seat of claim 14, wherein said drive assembly includes an actuator and an actuator cable.

20. The vehicle seat of claim 19, wherein said actuator includes a bi-directional electric motor.

21. The vehicle seat of claim 14, wherein said transmission assembly includes a drive shaft and a gear train operably connecting said drive shaft to said driven assembly, and said drive assembly includes an actuator and an actuator cable.

22. The vehicle seat of claim 21, wherein said inertia increasing coupling is disposed between said actuator cable and said drive shaft.

23. The vehicle seat of claim 14, wherein said first member has a radial arm appending therefrom, said second member has a longitudinal arm appending therefrom, and one of said first and second members is connected to said drive assembly and the other of said first and second members is connected to said transmission assembly.

24. The vehicle seat of claim 23, wherein said radial and longitudinal arms are moveable relative each other along a common circular path, and relative motion of said longitudinal and radial arms causes said driving and non-driving relationships.

25. The vehicle seat of claim 23, wherein said first and second members have a generally cylindrical geometry and said radial and longitudinal arms have a generally arched geometry.

26. The vehicle seat of claim 23, wherein said second member includes a collar attached at a distal end of said longitudinal arm, said collar receiving said first member for maintaining alignment of said first and second members.

* * * * *